INVENTOR
JOHN ZUERCHER
BY
*Wentworth B. Clapham*
ATTORNEY

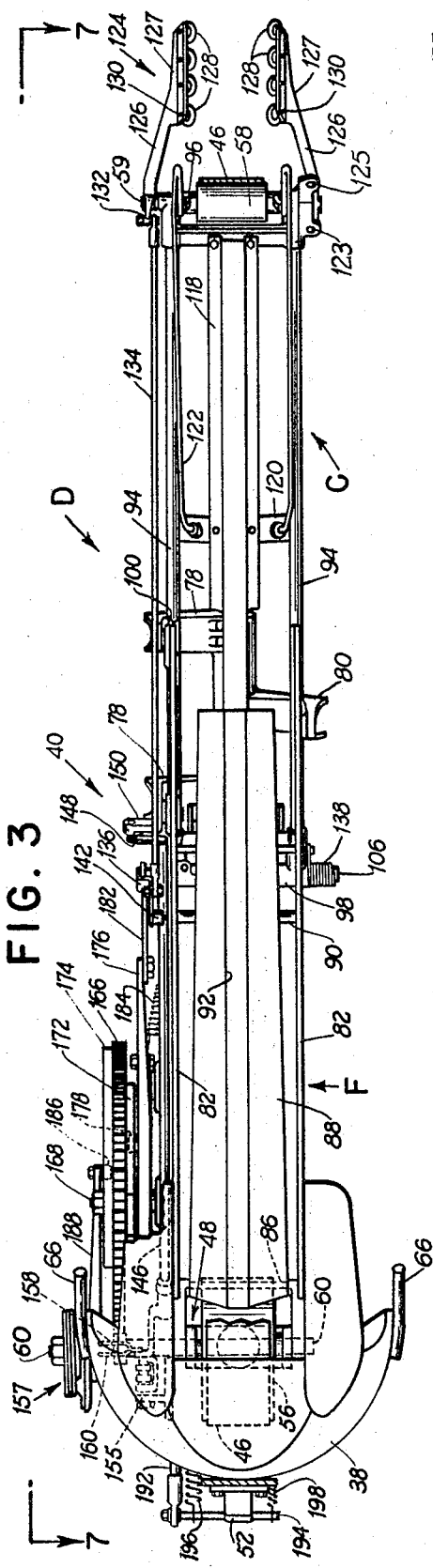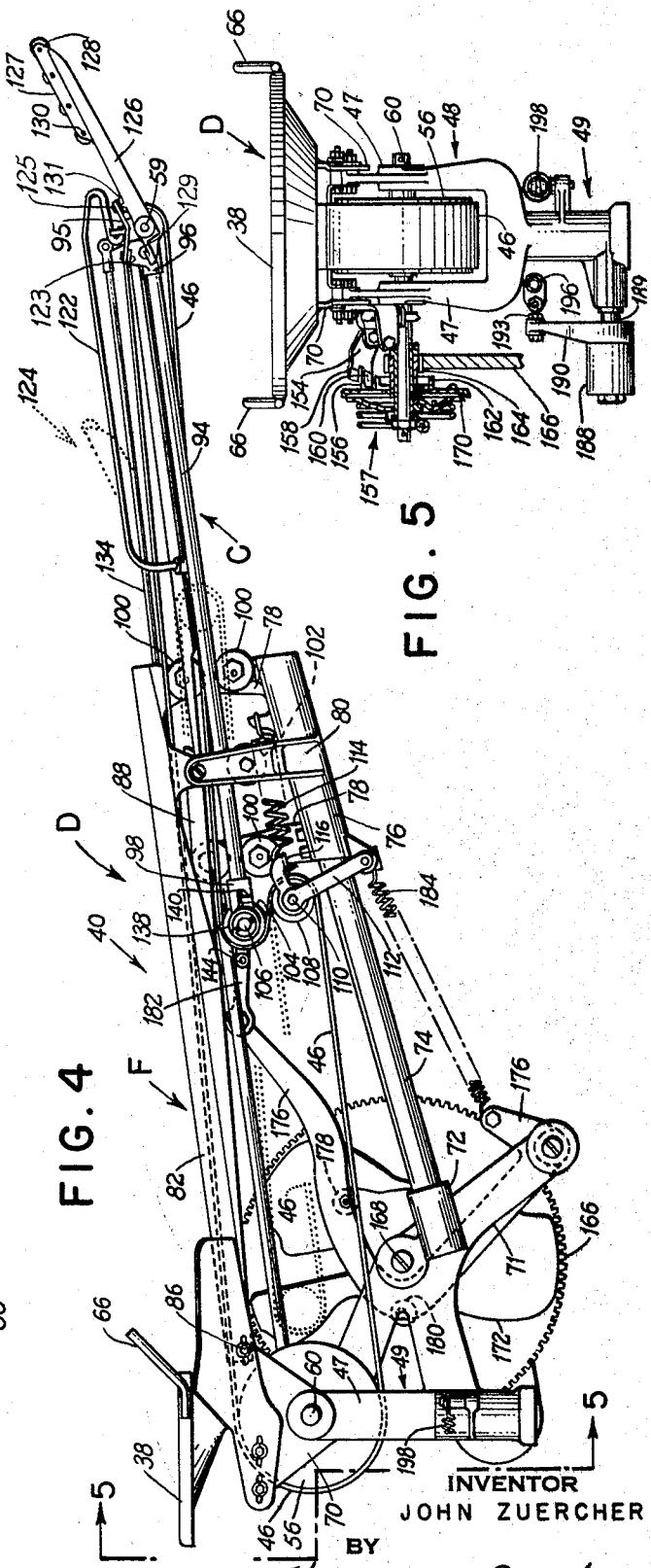

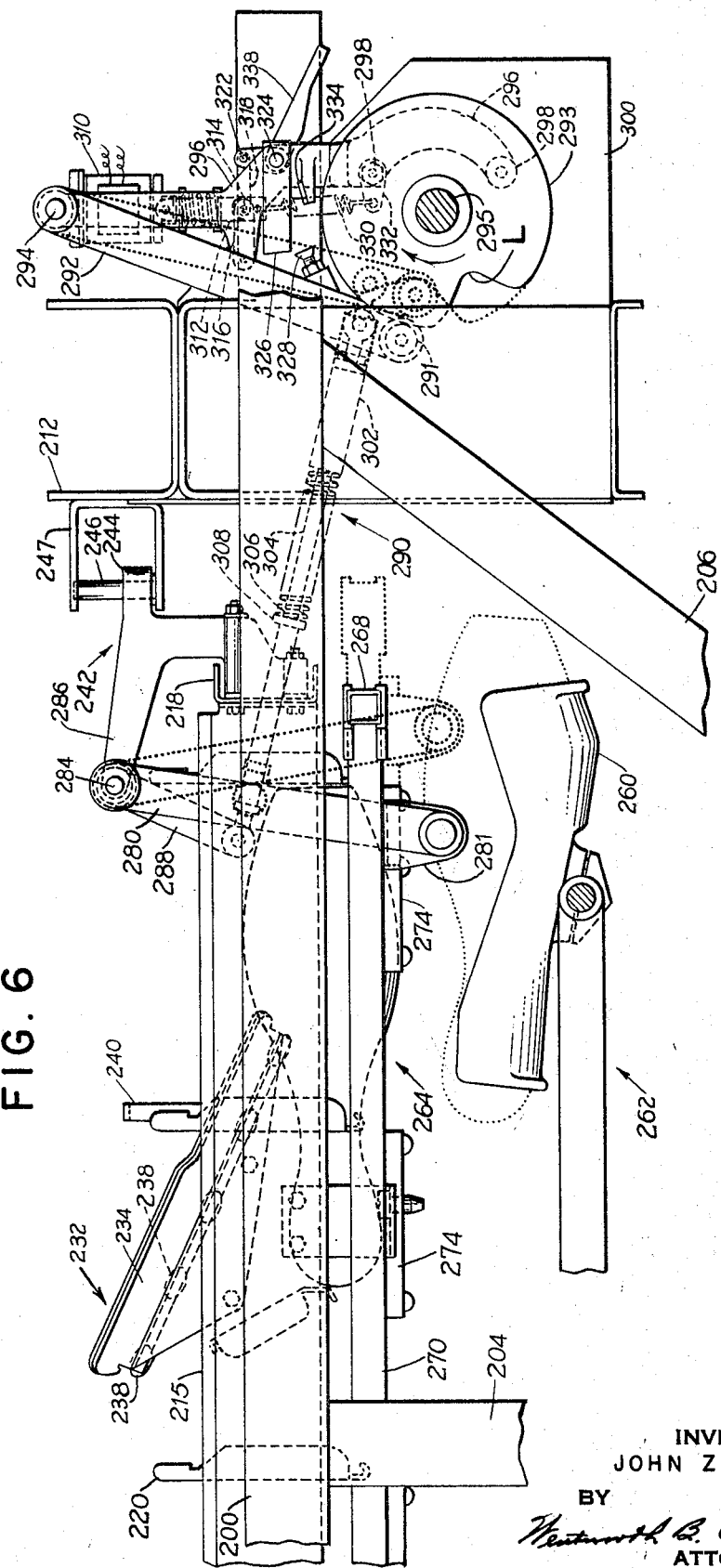

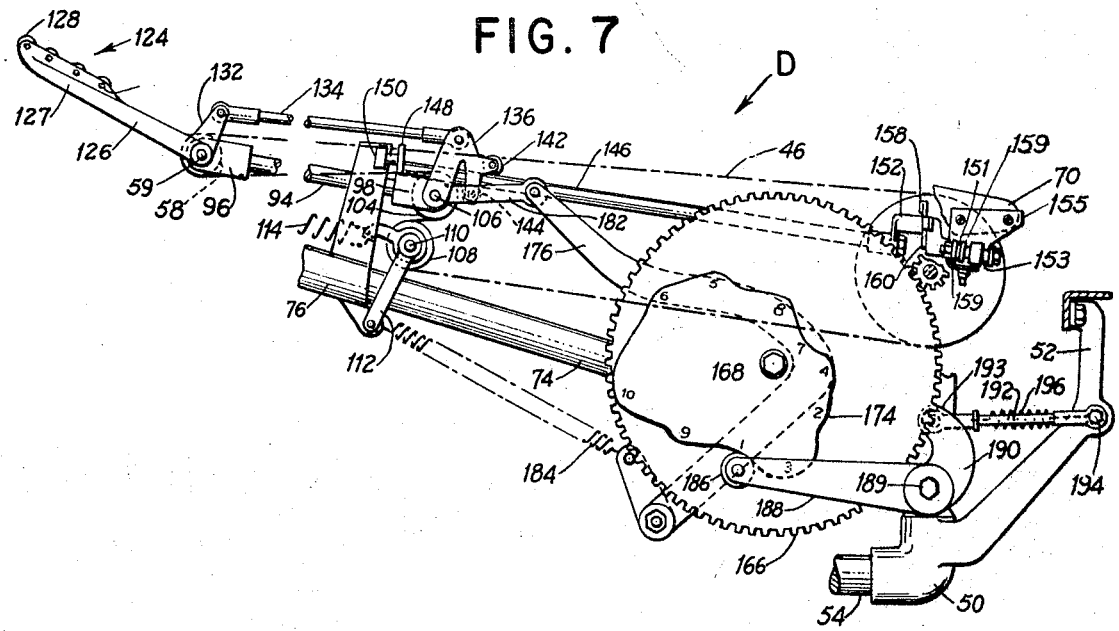
FIG. 7
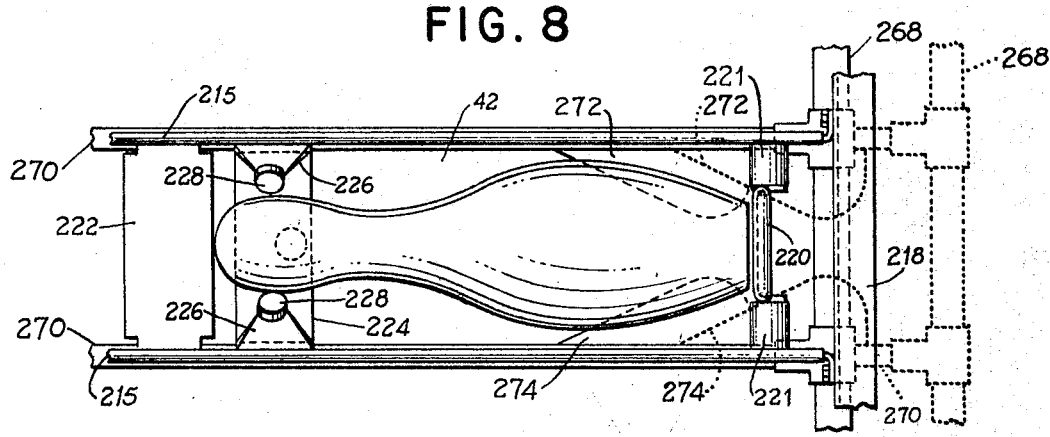
FIG. 8
FIG. 9
FIG. 13
INVENTOR
JOHN ZUERCHER
BY
*Wentworth B. Clapham*
ATTORNEY

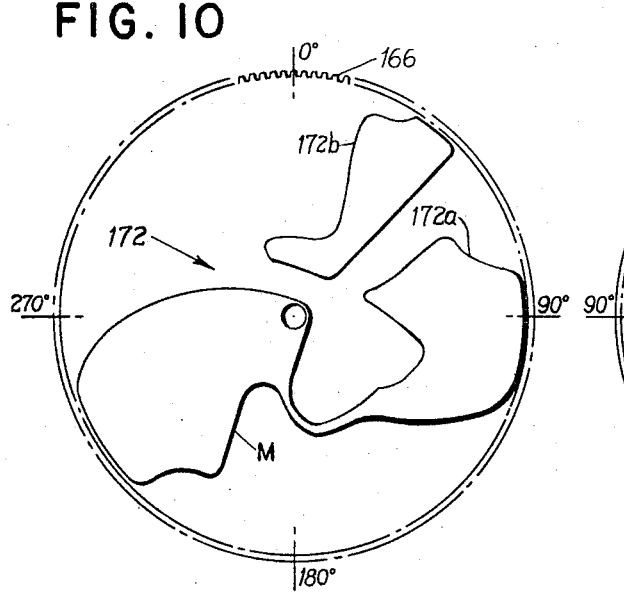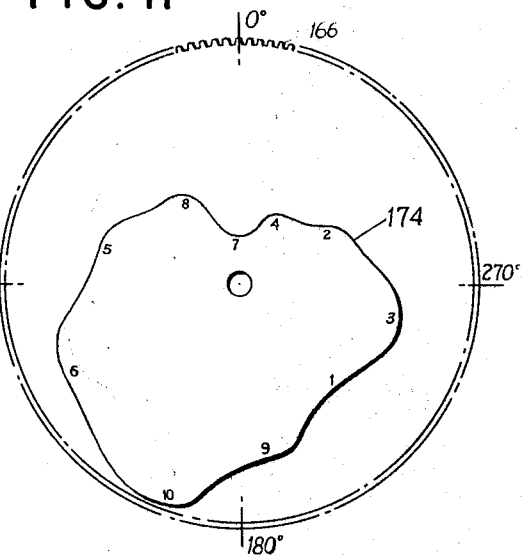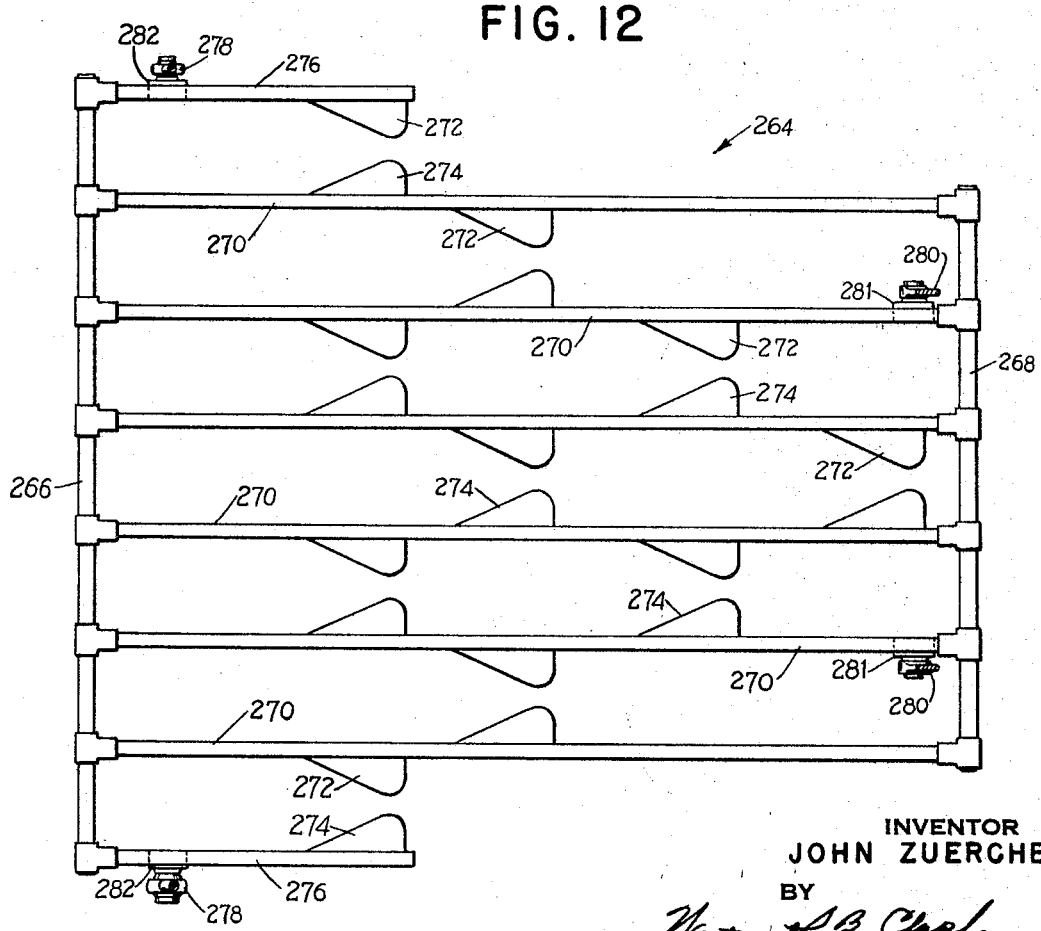

United States Patent Office 3,526,401
Patented Sept. 1, 1970

3,526,401
PIN DISTRIBUTING APPARATUS WITH CANTILEVER SUPPORTED EXTENSIBLE BELT CONVEYOR
John Zuercher, Mansfield, Ohio, assignor to American Machine & Foundry Company, a corporation of New Jersey
Filed Mar. 15, 1965, Ser. No. 439,910
Int. Cl. A63d 5/09
U.S. Cl. 273—43          23 Claims

ABSTRACT OF THE DISCLOSURE

A bowling pin handling apparatus for use with a bowling pinspotting machine comprising an elongated, contractable-expansible, variable length distributing conveyor. A pin storage magazine is mounted beneath said conveyor. A plurality of pin receiving and storing pockets are arranged in generally triangular formation in said magazine. The conveyor is pivotally mounted at one end only whereby the other end thereof can swing freely back and forth above said pockets. The conveyor is moved across said magazine to deliver bowling pins into said pockets and its length is varied to effect the successive delivery of pins from the end of said conveyor into selected pockets. A frame is provided with a plurality of pin supports conforming in arrangement with the arrangement of said pockets in said magazine. The frame is mounted for movement beneath said magazine in a substantially horizontal plane beneath said magazine to effect the discharge of a single pin from each of said pockets.

---

This invention relates to bowling pinspotting machines, and more particularly to apparatus for distributing and storing pins to be set on a pin deck of a bowling lane.

The present invention relates to a mechanism which receives pins that have been elevated from the pit of a bowling lane, and delivers them one by one into pockets or compartments of a pin storage magazine for subsequent discharge into means, such as pinspotters or cups, which place them in desired playing arrangement on the pin deck of the bowling lane. In accordance with the invention, the pin distributing mechanism comprises an elongated arm or boom which is constructed and mounted for free movement back and forth above a pin storage magazine and is extended or retracted in order that pins can be delivered therefrom one by one from the end of the boom into selected pockets or compartments according to a predetermined delivery pattern.

The invention also provides a novel pin distributing mechanism in which, if a pin should be delivered improperly to the distributor from the pin elevating conveyor, say, head foremost instead of butt foremost; and a part thereof should project above the magazine, because of the construction and operation of the distributor, even if it should move against such projecting pin and stop, it is only necessary to move the distributor manually away from this obstructing pin, and remove it, whereupon the desired delivery of pins into the storage pockets or compartments of the storage magazine could continue.

Occasionally, a pin in the pinspotter may not be spotted on the deck of the bowling lane and may be carried back to pin receiving position beneath the storage magazine. Means are provided in accordance with the invention for so supporting the magazine that in effect it is vertically floatingly mounted whereby damage and/or breakage of parts of the machine is obviated because the magazine can yield upwardly under the influence of the pin in the pinspotter cup. In such case, the machine can be stopped, the unwanted pin in the pin cup can be removed, and then the machine can be restarted in normal sequence of operations.

It is an object of the invention to provide a novel pin distributing mechanism comprising a freely movable extensible and retractable conveyor or boom which is operated to effect the delivery of bowling pins thereof in accordance with a predetermined pin delivery pattern into selected compartments in a pin storage magazine.

It is a further object of the invention to provide a novel freely movable extensible and retractable pin distributor comprising a boom which is moved back and forth across a pin storage magazine provided with a plurality of triangularly arranged pockets or compartments each capable of storing one or more bowling pins and in which there is no connection with or engagement by the delivery end of the conveyor or boom with the pin storage magazine.

It is a further object of the invention to provide a novel bowling pin distributing mechanism having a unique cam system for effecting the desired lateral movement of the distributor above the pockets of a storage magazine and for extending and retracting the extensible and retractable conveyor or boom forming a part of the distributor in order to effect the programmed delivery of bowling pins into selected pockets of the magazine.

The invention further consists in the provision of a novel pin storage magazine provided with a plurality of pin pockets or compartments each capable of containing one or more bowling pins positioned in substantially horizontal arrangement and movable shutter means operative to effect the delivery of a single pin only from each of the pockets into a pinspotter located therebeneath for placement thereby in proper standing playing positions on the pin deck of a bowling lane.

It is an added object of the invention to provide a novel bowling pin distributing and storage apparatus in which bowling pins are delivered one by one from the free end of a distributor having an extensible conveyor or boom into triangularly arranged pockets of a pin storage magazine, each pocket being capable of holding a plurality of horizontally positioned pins stacked one above the other, and movable shutter means associated with the magazine operable to effect the delivery of a single pin only from each of the pockets into pinspotting cups of a pinspotter for placement thereby on the playing deck of a bowling lane.

It is a further object of the invention to provide a pin distributing mechanism which is simple in construction, efficient in operation, relatively low in cost, and one which is driven and positioned by a single source of power.

With these and other objects not specifically mentioned in view, the invention consists in certain combinations and constructions which will be fully described hereinafter, and then set forth in the claims hereunto appended.

In the accompanying drawings which form a part of this specification, and in which like characters of reference indicate the same or like parts;

FIG. 3 is a plan view of the distributing mechanism in accordance with the invention;

FIG. 4 is a side elevation of the structure shown in FIG. 3 illustrating the cantilever extensible motion of the distributor;

FIG. 5 is an end elevation, taken along lines 5—5 in FIG. 4;

FIG. 6 is a partial side elevation of a typical pin storage bin, shuttle grid and mechanism for operating shuttle;

FIG. 7 is a side elevation of the distributor taken along line 7—7 in FIG. 3, showing the mechanism for swinging and extending the distributor;

FIG. 8 is a plan view of a storage bin, showing movement of the shuttle;

FIG. 9 is a section view of a typical storage bin unit and shuttle grid, taken along line 9—9 in FIG. 2;

FIG. 10 is a view of the cam formed with two coacting cam elements which controls the reciprocating movement of the movable carriage of the distributor;

FIG. 11 is a view of the cam which effects the desired lateral swinging movement of the distributor;

FIG. 12 is a plan view of a preferred form of pin shuttle embodying the invention; and FIG. 13 is a diagrammatic view of a suitable wiring diagram.

Figure 1:
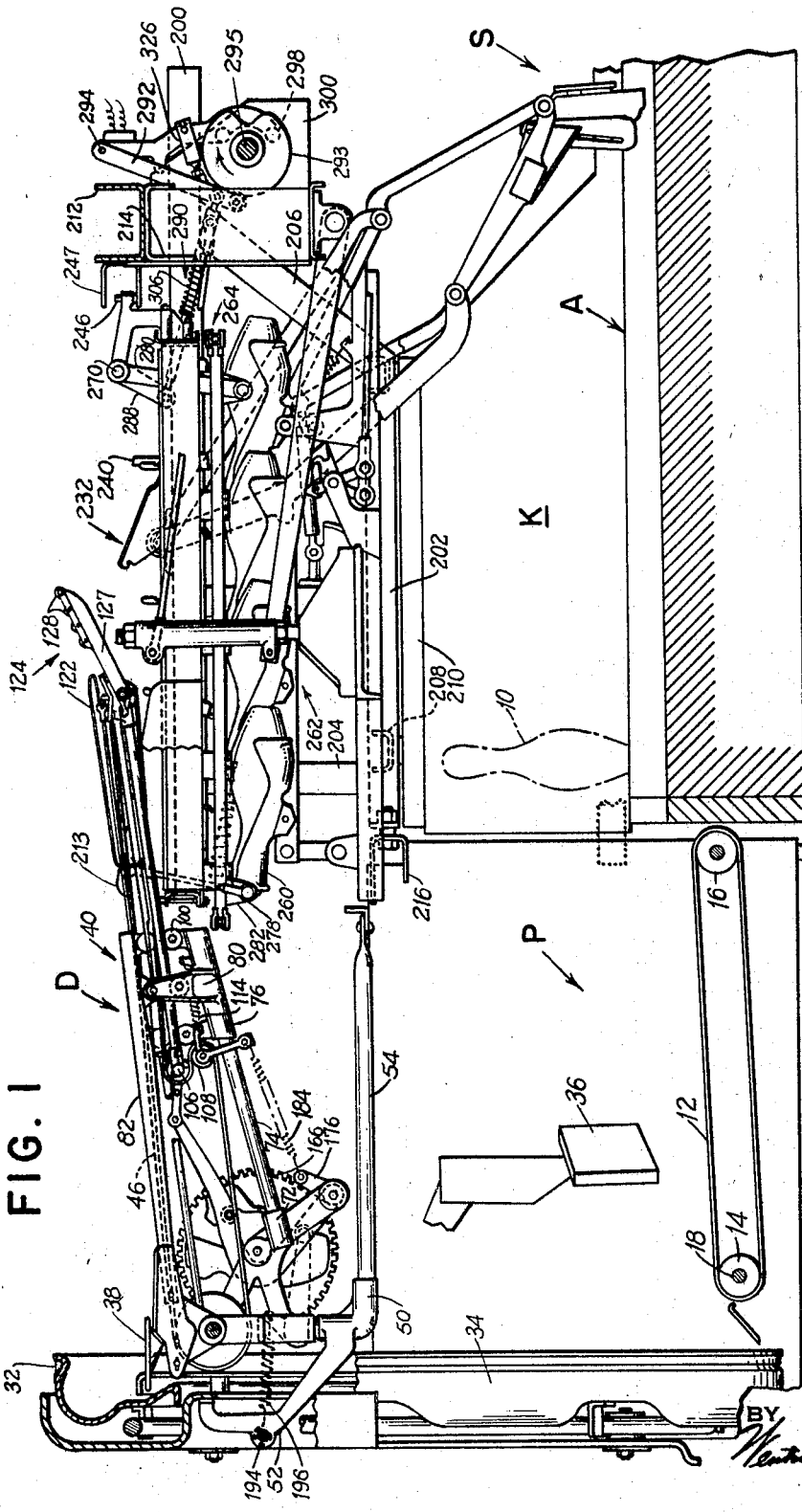
FIG. 1 is a side elevation, partially in section, of a bowling pinspotting machine embodying the invention.

Referring to the drawings which illustrate a preferred embodiment of the invention, bowling pins 10, falling from or removed from lane A by any suitable means, such as sweep S after a bowler has rolled each ball of a frame in the play of the game, drop upon a conveyor or traveling pit-wide apron designated generally 12 in pit P. Sweep S and conveyor 12 may be the same in construction and operation as those shown in Blewitt et al., co-pending application Ser. No. 195,928, filed May 18, 1962, now U.S. Pat. 3,248,109. Since these mechanisms form no specific part of this invention, further detailed description and showing thereof is deemed to be unnecessary.

Conveyor 12 runs on pulleys 14, 16 suitably rotatably supported in pit P. Shaft 18 of pulley 14 is provided with a pulley (not shown) on which runs a driving belt 20 (FIG. 2) running on a pulley 22 fixed to shaft 24 of a suitable reduction gear motor 26. This motor is also provided with a shaft 28 mounting pulley 30 on which runs belt 32 which travels in a suitable circumferential groove in pin elevating conveyor 34. When the pinspotting machine of which this mechanism forms a part is in operation, motor 26 is in continuous operation. Thus conveyor 12 and pin elevating conveyor 34 are also driven continuously at predetermined desired speeds.

Bowling balls arriving in pit P are separated from pins 10 by a conventional back-stop 36 suitably supported in pit P. Pins 10 are delivered by conveyor 12 into pockets (not shown) in elevating conveyor 34 and conveyed thereby to a point of delivery therefrom whence they drop into receiving and orienting member or pan 38 of distributor D. Conveyor 34 and member 38 may be generally the same in construction and operation as member 182 shown in U.S. Pat. 2,767,984. Since they form no specific part of this invention further description and disclosure thereof are omitted in the interest of brevity.

Distributor D, in addition to receiving member or pan 38, is provided with an elongated boom or arm 40 constructed to be extended and retracted in accordance with a predetermined programmed delivery of pins from the end of boom 40 into pin receiving compartments or pockets 42 of pin storage magazine 44, described more in detail hereinafter. Boom or arm 40 supports an endless conveyor belt 46 by means of which pins 10 are conveyed from pan 38 for delivery therefrom into pockets 42.

Referring now to FIGS. 1, 2, 3, 4 and 5, distributor D is supported at one end in spaced arms 47 of yoke 48 forming a part of main support casting 49, pivotally mounted in support bracket 50. This bracket is attached to the frame of the machine by leg 52 and support rod 54. As clearly shown in FIGURES 1 and 4, boom or arm 40 extends forwardly in cantilevered relationship above, and has no connection to or engagement with pin storage magazine 44. This construction permits free swinging movement of boom 40 relative to the pin storage magazine, not only in the course of delivering pins to pockets 42, but to allow for free movement of boom 40 when and if it is desired.

Endless belt 46 runs on driving pulley 56 and driven pulley 58. Pulley 56 is fixed to shaft 60 driven by extension shaft 62 through suitable universal joint connections 64 from shaft 24 of motor 26. As shown in FIGS. 1 and 3, pulley 56 is positioned between the spaced sides of receiving member or pan 38 such that bowling pins delivered from elevating conveyor 34 upon being oriented by rods 66 of member 38 are received butt end foremost on belt 46, and are conveyed thereby forwardly for discharge from the front end of boom 40.

Cantilevered boom or arm 40 of distributor D comprises a fixed portion F, and an extensible and retractable carriage C which is moved relative thereto to effect the delivery of pins therefrom into pin pockets 42.

Referring to FIGS. 1 and 4, main support casting, designated generally 49, includes yoke 48, which has extensions 70. A tubular lug 72 formed on another extension 71 of casting 49 supports one end of an elongated rod 74. The other end of rod 74 mounts a bracket 76 provided with two longitudinally spaced upstanding standards 78 and a single upstanding standard 80 spaced laterally therefrom on a line substantially normal to the midpoint of a line connecting the centers of standards 78.

Fixed portion F is provided with two elongated laterally spaced side pin guide plates 82 having their ends connected to the spaced side walls of pin receiving and orienting member 38, secured to extensions 70 of yoke arms 47, and their front ends attached to the free ends of standards 78 and 80. Extensions 70 also support cross pin 86 on which is supported one end of an elongated support plate 88 extending longitudinally of portion F to a point adjacent standard 80. A second cross pin 90 fixed to side plates 82 secures the front end of support plate 88 in proper operative position between guide plates 82. Referring to FIG. 4 it will be seen that the structure of fixed portion F of distributor D is shaped generally in the form of a triangle and due to the structural organization of main support casting 49, elongated rod 74 and bracket 76, it provides a rigid support for carriage C. Therefore, as carriage C is reciprocated back and forth relative to portion F of distributor D, carriage C is always maintained free from wobbling or vibrations as it moves above magazine 44 in delivering pins into pockets 42.

As shown in FIG. 3, support plate 88 preferably is provided with a longitudinally extending central dished formation or groove 92. This groove over which the active pin conveying lap of belt 46 runs tends to center or prevent pins from rolling sidewise as they move along fixed distributor portion F. This construction is important because it insures proper spacing of pins enroute to the discharge end of boom 40 due to the prevention of drag or wobbling of pins against side plates 82 as they are moved along by conveyor belt 46 and carriage C. It also prevents lateral vibrations of bottom 40 which might result in improper delivery of pins to pockets 42 of storage magazine 44.

Carriage C is formed with a pair of elongated laterally spaced rods 94 secured together at their ends by transverse front and rear carriage connecting members 96 and 98, respectively. Carriage C is supported for reciprocatory movement relative to fixed portion F. This support is effected by pairs of vertically spaced rollers 100 mounted on standards 78, shaped to engage opposite sides of one rod 94 of carriage C; the other rod rests on roller 102 mounted on standard 80. It will be noted that the active lines of support of roller 100 and 102 lie in the same plane for free reciprocatory movement of carriage C back and forth relative to fixed portion F of distributor D.

Pulley 58 is supported rotatably on shaft 59 mounted in front connecting member 96. Belt 46 also runs on idler pulley 104 rotatably mounted on shaft 106 journalled in member 98, and on take-up pulley 108 on shaft 110 carried by levers 112 pivotally attached to bracket 76. Spring 114 attached at one end to cross bracket 116 carried by shaft 110 and at its other end to bracket 76 takes up slack in belt 46 and maintains it properly tensioned when carriage C is extended or retracted during the operation of distributor D.

Elongated plate 118 attached to front connecting member 96 and to cross plate 120 suitably mounted in rods 74, acts as a support beneath that part of belt 46 extending along carriage C. Pins being conveyed along carriage C pass between laterally spaced guide rods 122 which insure the proper travel of pins on distributor D enroute to the delivery end of carriage C. The ends of rods 122 are mounted in cross plate 120 and front connecting member 96 (see FIGS. 3 and 4).

The movement of distributor D or boom 40 laterally across storage magazine 44, and the travel of carriage C relative to fixed portion F is initiated by trip 124. Trip 124 comprises a pair of spaced elongated arms 126 secured to the ends of shaft 59 rotatably supported in front connecting member 96. Each arm is formed with an inwardly and downwardly inclined flange 127 on which a plurality of substantially equidistantly positioned nonfriction ball bearing rollers 128 is mounted, each roller being mounted for free running movement on a stud 130. The angular position of the rollers on arms 126 is such that the heads of pins delivered from carriage C at all times can fall free of obstruction between arms 124. Also, the angular arrangement of rollers 128 results in a radial pressure by pins on the rollers and, therefore, results in a more efficient discharge of pins from carriage C.

One arm 126 (see FIGS. 3 and 7) is provided with an extension 132 pivotally connected by an elongated rod 134 extending along carriage C to the free end of trip lever 136 fixed to one end of shaft 106. The other end of shaft 106 on the opposite side of carriage C (see FIG. 3) is encircled by spring 138 having one end attached to shaft 106 and its other end bearing against lug 140 on member 98. Spring 138 functions to maintain trip arms 126 in their "up" position, or that shown in FIGS. 1, 4 and 7. The tension of spring 138 is less than the force exerted by a bowling pin moved by belt 46 against and upon arms 126. When this occurs, arms 126 swing downwardly under the weight of a pin which then rolls along rollers 128 and drops butt end downwardly into a selected pocket 42. The delivery of each pin causes trip lever 136 to move counterclockwise, as viewed in FIG. 7, which results in the programmed movement of distributor boom 40, and also the movement of carriage C to effect the delivery of the next pin into a selected pocket 42.

As best illustrated in FIG. 7, trip lever 136 is provided with two spaced rollers 142, 144 mounted for engagement with opposite sides of an elongated actuating rod 146 which extends along fixed portion F of distributor D. The front end of rod 146 is fixed to a lever 148 pivotally mounted in lug 150 on the rear standard 78 of bracket 76. The rear end of rod 146 is attached to trip stop assembly lever 152 swingably mounted and axially movable on pin 153 in bracket 155 attached to extension 70 of casting 49.

Front connecting member 96 is provided at one side with a stop bracket 95 having resilient stops 123 and 125 which are engaged by corresponding stop members 129 and 131 on one arm 126 to limit the extent of upward and downward movement of trip 124.

A stop plate 154 attached to lever 152 extends outwardly therefrom into position to engage a stop lug 156 on the inner plate of a friction drive clutch 157 mounted on shaft 60. Clutch 157 is similar in construction and operation to that disclosed in U.S. Pat. 2,769,637 granted Nov. 6, 1956. As shown in FIG. 5, stop plate 154 is provided with two vertically spaced blades; an upper blade 158 and a lower blade 160. Lower blade 160 is offset rearwardly from the plane of upper blade 158 (see FIG. 7), and normally is maintained in position to be engaged by lug 156 to stop programmed movement of distributor D until a pin leaves arms 126 of trip 124. However, when a pin moves onto arms 126 and depresses them, blade 160 is moved out of engagement with lug 156 which is then engaged by upper blade 158. At this time distributor D is still maintained against movement.

A resilient washer 151 mounted on pin 153 between two washers 159 serves to absorb any shocks that might be exerted by axial movement of lever 152 on pin 153 by engagement of lug 156 engaging blades 158 and 160.

When a pin has left arms 126, spring 138 returns them to their "up" position, which frees lug 156 from blade 160 whereupon the clutch 157 is engaged for one revolution of shaft 60 and distributor D is moved through its next programmed phase of operation. The stepped relationship of blades 158, 160 insures the complete removal of each pin before boom 40 can be moved to its next delivery position. The programmed operation of carriage C is such that trip arms 126 are always moving away from a pin delivered thereby. This construction and operation of distributor D substantially eliminates danger of jams and damage to the machine if for any reason a pin is improperly fed to a pocket 42.

Shaft 60 which is continuously driven by motor 26 loosely rotatably supports a sleeve 162 on which driving gear 164 is mounted. This gear meshes with intermittently driven gear 166 carried by shaft 168 suitably journalled in casting 49. Sleeve 162 is fixed to inner disc 170 of clutch 157. When, upon release of lug 156 on disc 170 by blades 160 and 158, clutch 157 is engaged, gear 164 then rotates gear 166. In the embodiment selected for illustration, the machine is designed to set a frame of ten pins. Therefore, gear 166 makes $\frac{1}{10}$ of a revolution for each complete revolution of gear 164.

Gear 166 is provided with two cams 172 and 174, preferably formed integrally therewith, one cam being formed on each face of the gear. These cams can be considered as pin delivery program cams because they effect the delivery of pins to pockets 42 of magazine 44 in a predetermined selected sequence. As shown herein pins are delivered to pockets 42 as follows: #1, #3, #2, #4, #7, #8, #5, #6, #10, #9. Obviously, other selected pin delivery patterns could be made by changing the profile of cam 172 (sub-cams 172a and 172b) and cam 174.

Cam 172 controls the longitudinal movement of carriage C of boom 40. Cam 174 controls the lateral movement of boom 40 above magazine 44.

It will be appreciated that by changing the profiles of cams 172 and 174, and varying the tooth ratios of gears 164 and 166, the programmed delivery of pins to any desired positions of pins in a storage magazine when less than ten per frame can be changed to meet such requirement.

Cam 172 operates a sickle-shaped lever 176 provided with two cam followers 172, 180. The free end of lever 176 is connected by link 182 to rear connecting member 98 of carriage C. Thus when cam 172 moves lever 176, carriage C is given the desired inward or outward movement relative to distributor portion F. Cam 172 consists of two separated coacting cam sections 172a and 172b. When carriage C is extended to its outermost position; i.e., a pin is being delivered to #1 pocket, cam follower 180 tracks a portion of cam section 172a and cam follower 180 moves into engagement with a portion of cam section 172b until, on continued rotation of gear 166, cam follower 178 moves on to portion M of cam section 172a and cam follower 180 is moved out of contact with cam 172b. This motion of lever 176 results in carriage C being retracted to its next pin delivery position. Each operative or pin delivery position of carriage C and the positions of engagement of cam followers 178 and/or 180 with the profiles of cam section 172a and 172b could be described in detail. It is considered, however, that this is not necessary to an understanding of the operation of these cams. Suffice it to say that the coaction between cam followers 178 and 180 with cam sections 172a and 172b operates lever 176 in such manner that with the concurrent lateral movement of boom to a selected position arms 126 of carriage C are always properly located for delivery of a pin to a selected pocket 42 of magazine 44. Spring 184 attached to lever 176 and to bracket 76 hold cam followers 178 and/or 180 in engagement with cam sections 172a and/or 172b.

Cam 174 on gear 166 controls the lateral movement of boom 40 to selected programmed pin delivery positions. At each such position it will be understood that carriage C has been extended or retracted by cam 172 in order to locate trip arms 126 in their proper delivery position. Cam 174 is tracked by cam follower 186 on lever 188 pivotally mounted on shaft 189 in casting 49. Lever 188 is provided with an arm 190 swivelly connected by means of a suitable connection such as a "Uniball" connection 193 to one end of a telescoping or extensible link 192. The other end of link 192 is connected in the same manner to pin 194 in leg 52 of pocket 50. A spring 196 maintains link 192 in retracted position. A spring 198 having one end attached to an arm extending from the hub of casting 49 and its other end secured to pin 194 on leg 52 maintains cam follower 186 in tracking engagement with cam 174. The swivel connection of lever arm 190 to link 192 provides a fulcrum about which distributor D swings laterally above magazine 44. Link 192 also makes it possible to push distributor D to the right or left, if any reason therefor should arise.

Figure 2:
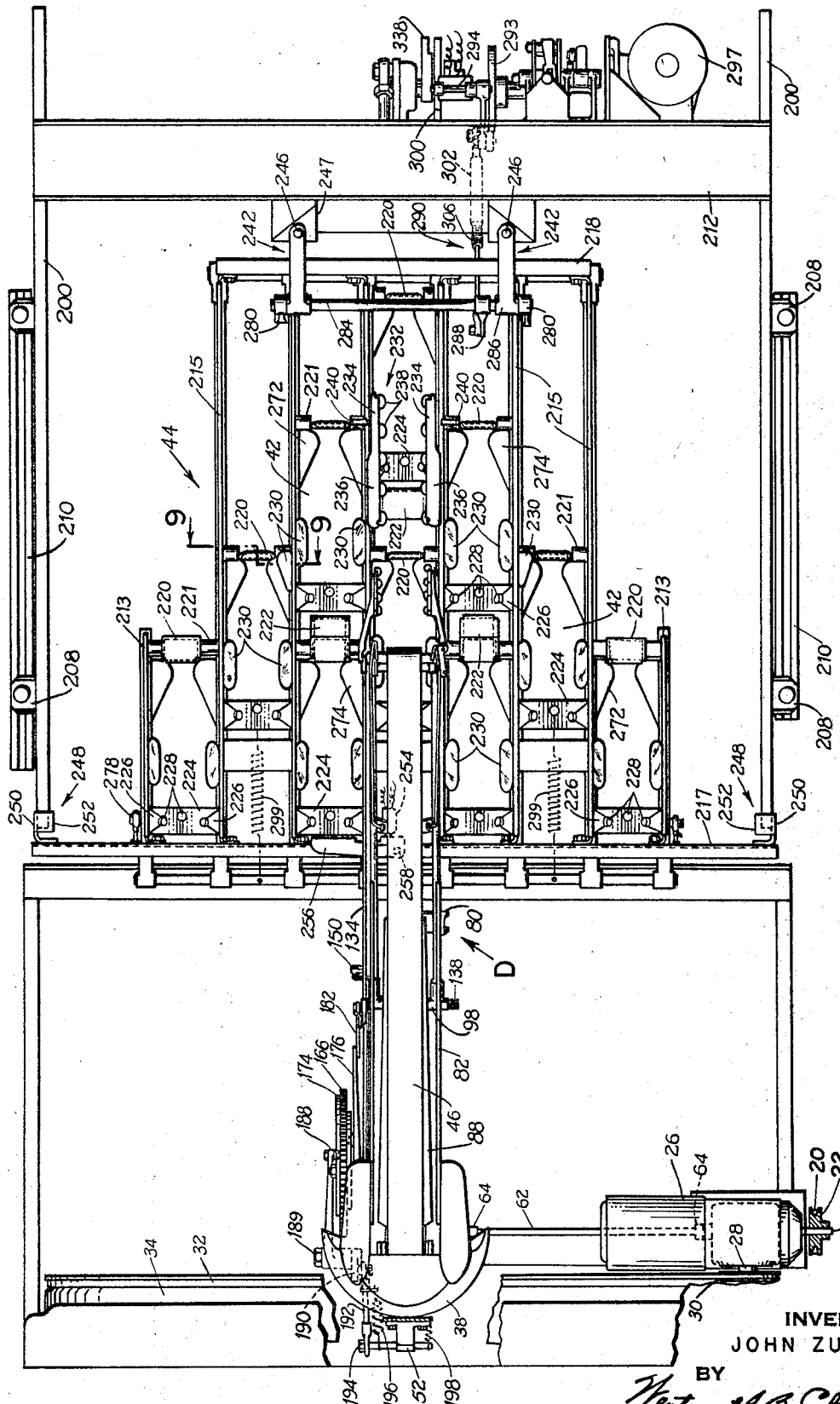
FIG. 2 is a plan view of a preferred form of the pin distributing and spotting mechanism embodying the invention, with parts broken away.

Referring to FIGS. 1 and 2, it will be seen that distributor D has no connection with pin magazine 44. This provides for complete freedom of movement of distributor D and carriage C. It also provides for assembling and operation of the machine without any need for adjustments of distributor D relative to magazine 44 and for upward movement of magazine 44, if for any reason this should occur during the operation of the machine without breakage of parts or damage thereto.

As shown in FIGS. 1 and 2, the machine illustrated herein is provided with laterally spaced side frames, each consisting of upper and lower horizontal members 200, 202, respectively, joined by a rear upright 204 and an inclined front connecting member 206. Lower member 202 is provided with brackets 208. Bolts (not shown) passing through holes in brackets 208 secure side frame members 202 to mounting rails 210 fixed to the stops of kickbacks K of lane A. Cross channel 212 is connected to brackets 214 which are attached to the front end of frame member 200. Channel 216 connects the rear ends of lower frame member 202. Other suitable cross frame members (not shown) provide a rigid frame structure.

Pin magazine 44 in the embodiment of the invention illustrated herein is provided with ten triangularly arranged components or pockets 42 mounted in a magazine frame. It will be appreciated that the number and arrangement of pockets 42 can be varied to meet the requirements of a particular game, such as five pins or nine pins.

Referring to FIG. 2, pin pockets 42 which hold pins corresponding to pins #7 and #10 are formed with relatively short exterior side walls 213 and elongated interior walls 215. There are six parallel spaced walls 215 which provide compartments or pockets 42 for pins #1, #2, #3, #4, #5, #6, #8, and #9. The rear ends of walls 213 and 215 are suitably attached to cross channel 217 of magazine 44. The front ends of walls 215 are secured to front channel member 218 of magazine 44.

The lateral distance between walls 212 and 215 and their height is sufficient for accommodating at least one horizontally positioned bowling pin in each pocket. As illustrated herein, each pocket 42 can hold two pins, one pin on top of another. Compartments or pockets 42 are essentially the same in construction. Referring to pocket 42 for pin #10, there is provided a pin butt guide 220 against which the butt end of a pin moves as it enters the pocket. Each guide 220 which forms the front end of a pocket 42 is attached to walls 213 and 215 by suitable conventional resilient shock mount connections 221, which absorb the shock imparted to a butt guide 220 when a pin is delivered into a pocket and also prevent a pin from bouncing around therein.

The vertical wall of channel 217 forms the rear end of pockets 42 which hold pins #7–#10. The rear ends of all other pockets consists of a generally vertically inclined plate 222 suitably supported on walls 215. The distance between the bottoms of butt guides 220 and rear end plates 222 is somewhat greater than the length of a bowling pin. In the embodiment of the invention disclosed herein, the apparatus is designed to handle ten pins which are 15 inches long. It has been found that a distance of 15½ inches between guides 220 and plates 222 gives satisfactory results. Each pocket is provided with a pin head cradle or downwardly curved cross member 224 rigidly attached to side walls 213 and 215. These cross members have inwardly turned ears 226 on each end on which are mounted elastomeric stops 228 on which the head end of the lower of the two pins in a pocket 42 rest. A similar stop 228 also is mounted centrally on each curved cross member 228. Stops also act to prevent damage to pins coming in contact therewith, they tend to cut down noise of pin handling and minimize movement of pin heads which engage them.

Each pocket 42 is provided with a pair of spaced downwardly inclined pin guides, each extending from a point near the top to a point near the bottom of walls 213 and 215 in the case of pockets 42 of pins #7 and #10, or walls 215 of the remaining pockets with the exception of #1 pin pocket 42. These guides insure the proper movement of pins downwardly into a pocket 42. Their spacing is such that they support the butt end of a pin, but allow the head end thereof to drop between them when a pin reaches the lower limit of its travel in a pocket.

Certain pockets 42 such as pins #1, #4, and #6 differ somewhate from the others. Pockets holding pins #4 and #6 pins are provided with an additional pin guide 230 mounted on its inner wall 215 adjacent its respective butt guide 220. Guides 230 act as guides or cams in assisting the movement of the top pin of two stacked pins in pockets 42 of pins #4 and #6 downwardly to bottom or "next to be delivered into spotter" position, when the lower of two pins in these pockets is fed to a spotter cup.

Pin pocket 42 for #1 pin comprises the same butt guide 220 and end plate 222 as in pockets 42 for pins #2–#6. However, its pin guides 232 are different from pin guides 230 of the other pockets. As shown in FIGS. 1 and 6, pin guides 232 comprise elongated plates 234 having outwardly flared flanges 236 which support a plurality of non-friction ball bearing rollers 238 similar to rollers 128 on carriage arms 126. Rollers 238 are so mounted that they are parallel to the radial line of each pin delivered into pocket 42 of #1 pin. The provision of elongated roller supporting guide plates 232 in this pin pocket insures satisfactory results with a minimum of extension of carriage C of distributor boom 40. Pocket 42 for #1 pin also is provided with additional upwardly extending side guides 240 which assist in directing the top pin in this pocket downwardly thereinto when the lower pin is delivered into the #1 spotting cup. Each of these guides 240 is suitably mounted on walls 215 adjacent the front end of side guides 232 of #1 pocket 42.

Two similar laterally spaced brackets 242 are secured by bolts to front channel 218 of pin magazine 44. Each bracket is formed with a horizontal arm 244 provided with a vertical bore by means of which magazine 44 can yield on or move vertically on pins 246 mounted in horizontal legs of channel 247 attached to connecting member 212. Provision also is made for the rear end of magazine 44 to yield or move upwardly by means of a bracket support 248 attached at each end of channel 216. Bracket supports 248 are mounted on channel 217 in such manner that they seat on the rear ends of upper frame members 200. Outer walls 250 of each bracket support 248 prevent substantial side movement of magazine 44. Legs 252 of these supports are so spaced vertically from each other that adequate upward yielding movement of magazine 44 can occur when and if the necessity therefor arises.

The top and bottom of each butt guide 220 and the pin engaging edges of all other guides and members are rounded or curved in order to prevent damage to pins delivered into pin pockets 42.

In the programmed sequence of delivery of pins into pockets 42, the last pin delivered is the #9 pin. The arrival of a pin in this pocket readies the machine for spotting a new set of pins. The information that a pin has arrived in #9 pocket 42, is communicated to the machine control by a normally open switch 254. A switch actuator plate 256 pivotally mounted on pin 258 in channel 217 is provided with a portion extending into #9 pin pocket 42 where it is engaged by the head end of a pin entering this pocket, and swings counterclockwise, as viewed in FIG. 2, to close switch 254 and thereby set into operation mechanism which effects the delivery of a new set of pins from pin magazine 44 into spotter cups 260 of spotter 262 for placement on lane A.

Pins are contained in magazine 44 by a longitudinally movable device or shuttle, designated generally 264. As best shown in FIG. 12, shuttle 264 conforms generally in shape to pin storage magazine 44. In the illustrated embodiment, it comprises a rear tubular cross frame member 266, and a front tubular cross frame member 268. Cross frame members 266 and 268 are joined together by six elongated rods or bars 270 spaced laterally from each other a distance substantially equal to the spacing between side walls 217 of magazine 44. These elongated bars (FIG. 12) support opposed complementary sets of elongated outwardly extending rounded end plates or pin holders 272 and 274 which are arranged to be disposed beneath pin pockets 42 corresponding to pin positions #1, #2, #3, #4, #5, #6, #8 and #9 of pin magazine 44. Pin holders 272 and 274 are so mounted on rods 270 that they are located beneath and adjacent butt guides 220 of the pockets when shuttle 264 is in its active pin holding position.

Referring again to FIG. 12, there are two short rods 276 mounted on and extending outwardly from rear cross frame member. These carry their respective pin holders 272 and 274 of the sets of pin holders corresponding to #7 and #10 pin pockets 42. Pin holders 272 and 274 are rigidly connected to their respective support bars 270 and 276.

Shuttle 264 is mounted for movement in a substantially horizontal plane beneath magazine 44 by a pair of rear links 278 and a pair of arms 280 which are of the same length. The upper ends of links 278 are pivotally supported in the upper portions of walls 215 (see FIG. 1). The lower ends of links 278 are pivotally secured to brackets 282 attached to bars 276 of shuttle 264. The lower ends of arms 280 are pivotally attached to brackets 281 mounted on two of the elongated bars 270 adjacent cross frame member 268. Arms 280 are fixed to shaft 284 mounted in arms 286 of brackets 242. Shaft 284 mounts a lever 288 connected by link 290 to lever 292 swingably carried by shaft 294 in bracket 296 fixed at 298 to frame plate 300 suitably attached to front cross frame members of the machine. Link 290 preferably is a suitable conventional type of safety link having a dash pot end portion 302 and a piston rod 304 at the other. Spring 306 encircles rod 304 and bears against collar 308 on rod 304 and end portion 302, as best shown in FIG. 6. This link connection between levers 280 and 292 allows link 290 to contract and prevent damage to the machine, if for any reason shuttle 264 is prevented from returning to its pin supporting position after a set of pins has been delivered into spotting cups 262.

The free end of lever 292 supports a cam follower 291 tracking cam 293 on shaft 295. This shaft is driven by motor 297 (FIG. 2) in the same manner as shaft 152 shown and described in copending Congelli et al. application Ser. No. 195,926, filed May 18, 1962, now U.S. Pat. 3,245,684. Cam 293 is provided with a low portion L such that when cam follower 291 rides thereon shuttle 264 is pulled to the right (as viewed in FIGS. 1, 2 and 6) by springs 299, thereby effecting the delivery of a set of ten pins from pockets 42 into cups 260 of spotter 262.

As shown in FIG. 2, there are two springs 299. Any suitable number can be used as long as they provide for the rapid, resilient forward movement of shuttle 264. Springs 299 are secured at their ends to rear shuttle cam frame 266 and to cross members 224 of #4 and #6 pin pockets 421. These springs also act to maintain cam follower 291 in tracking engagement with cam 293.

Solenoid 310 mounted on bracket 296 is provided with armature 312 connected by pin 314 to the free end of lever 316 and one end of link 318. Lever 316 is pivotally supported on pin 320 in an arm of bracket 296. The other end of link is connected to the free end of lever 322 fixed to shaft 324 in an arm of bracket 296, thereby forming a toggle connection with armature 312.

Shaft 324 carries a stop arm 326 operative when solenoid is deenergized to engage an adjustable stop 328 on lever 292. Spring 330 connected to armature 312 and to an arm 332 normally maintains armature 312 in its lowered or inoperative position at which time stop arm 326 rests upon resilient support 334 mounted in lug 336 forming a part of bracket 296. An actuating lever 338 secured to shaft 324 is moved in a clockwise direction, as viewed in FIG. 6, at the start of a spotting cycle. When this occurs, stop arm 326 is moved out of engagement with stop 328 for the purpose described hereinbelow. Solenoid 310 and lever 338 correspond to solenoid 166 and actuating lever 169, respectively, and the mechanism indicated generally 340 in FIG. 2 for operating pinspotter 262 to spot new sets of pins on lane A are essentially the same in construction and operation as shown and described in copending application Ser. No. 195,926, filed May 18, 1962 by Congelli et al. Further detailed description and showing in this case are deemed unnecessary to an understanding of the invention and are omitted in the interest of brevity.

The mechanism described hereinabove is so constructed and operated that when a set of ten pins in magazine 44 is to be delivered to spotter cups 200, solenoid 310 is energized and shaft 324 is rocked clockwise, as viewed in FIG. 6. This movement of shaft 324 causes actuating lever 338 to set into operation the means for moving table 262 as shown and described in said Congelli et al. copending application, and also effects the movement of stop arm 326 out of engagement with stop 328. By means of springs 299 and the operating links and levers described, due to the rotation of shaft 295, lever 292 is moved counterclockwise as cam follower 291 travels onto low portion L of cam 293. The resulting movement of shuttle 264 and the release of a new set of pins from pin holders 282, 274 then takes place as described.

The control circuit required for the operation of the mechanism embodying the invention is essentially the same as that shown in FIG. 3 and described in copending Blewitt application Ser. No. 195,927, filed May 18, 1962, now U.S. Pat. 3,231,272, except for the removal of relay contact TPR*b*, and the replacement of relay contact TPR*x* with a new normally open switch 254 of suitable conventional design in a selected pocket 42, mounted for operation by a pin upon its arrival in a selected pocket 42. As shown herein, switch 254 is located in such manner that it is actuated by plate 256 upon the arrival of a pin in the #9 pocket 42.

When a pin is delivered into the #9 pocket, switch 254 is closed and allows stepper 300, as shown in FIG. 3 of the above referred to Blewitt application, to proceed from step #9 to step #10 through level #1. This allows the spot relay SP to be energized, which in turn allows spot solenoid 166, shown in this same figure, to be energized when table relay TR is energized closing contact TR2, and thereby energizing the table motor.

As indicated above, solenoid 310 corresponds to solenoid 166 shown in FIG. 3 of the above referred to Blewitt application. The energizing of solenoid 310 thus allows cam 293 to turn and effect the pin releasing movement of shuttle 264 in response to the rotation of shaft 295 by table motor 297. In this way a single pin is released from each pocket 42 of magazine 44 and delivered into spotters 260. As long as pins are being delivered from pin elevating conveyor 34 of distributor D it remains in operation and effects the discharge of pins to discrete positions; i.e., selected pockets 42 of magazine 44.

What is claimed is:

1. A bowling pin handling apparatus for use with a bowling pinspotting machine comprising an elongated variable length distributing belt conveyor, a pin storage magazine, means mounting said magazine beneath said conveyor, a plurality of pin receiving and storing pockets arranged in generally triangular formation in said magazine, means mounting only one end of said belt conveyor whereby the other end thereof is not connected to the rest of the apparatus and can travel freely back and forth above said pockets, means for moving said belt conveyor above said magazine to deliver bowling pins into said pockets and means for varying the length of said belt conveyor to effect the successive delivery of pins from the end of said belt conveyor into selected pockets for later delivery to pin receiving means.

2. The apparatus defined in claim 1 wherein said pin belt conveyor includes endless traveling belt pin conveying means, and a reciprocally mounted carriage, and wherein said means for varying the length of said belt conveyor comprises programming means for extending and retracting said carriage and effecting the delivery of pins in accordance with a selected delivery pattern.

3. An article handling and conveying apparatus comprising an elongated belt conveyor having a receiving end and a discharge end, means mounting said discharge end on said receiving end for extensible and retractable movement relative thereto, a storage magazine for receiving and storing articles discharged from said belt conveyor, means supporting said belt conveyor only adjacent said receiving end thereof, said belt conveyor being movably supported thereat to provide free lateral movement of the discharge end above said magazine, means for moving said belt conveyor on said movable support means to discharge articles in succession from said belt conveyor, and means for extending and retracting said discharge end at different positions longitudinally displaced relative to said receiving end of said belt conveyor to deliver articles to said magazine in accordance with a predetermined delivery pattern.

4. The invention defined in claim 3 wherein said belt conveyor moving means is operative to move said belt conveyor intermittently, and wherein said magazine is provided with a plurality of pockets arranged in a predetermined array, and trip means engaged by each article discharged from said belt conveyor for effecting the intermittent operation of said belt conveyor moving means.

5. The invention defined in claim 3, including a transfer device for receiving articles from said magazine, supports for said magazine, and means mounting said magazine on said supports for vertical yielding movement of said magazine on said supports relative to said transfer device.

6. A bowling pin handling apparatus for use with a bowling pinspotting machine comprising an elongated, contractable-expansible, variable length distributing belt conveyor, a pin storage magazine, means mounting said magazine beneath said belt conveyor, a plurality of pin receiving and storing pockets arranged in generally triangular formation in said magazine, means pivotally mounting one end of said belt conveyor whereby the other end thereof can swing freely back and forth above said pockets, means for moving said belt conveyor across said magazine to deliver bowling pins into said pockets and means for varying the length of said belt conveyor to effect the successive delivery of pins from the end of said belt conveyor into selected pockets, a frame provided with a plurality of pin supports conforming in arrangement with the arrangement of said pockets in said magazine, means mounting said frame for movement beneath said magazine, and means for moving said frame in a substantially horizontal plane beneath said magazine to effect the discharge of a single pin from each of said pockets.

7. A bowling pin handling apparatus for use with a bowling pinspotting machine comprising an elongated variable length distributing belt conveyor, a pin storage magazine, means mounting said magazine beneath said belt conveyor, a plurality of pin receiving and storing pockets arranged in generally triangular formation in said magazine, means pivotally mounting one end of said belt conveyor whereby the other end thereof can swing freely back and forth above said pockets, means for moving said belt conveyor across said magazine to deliver bowling pins into said pockets and means for varying the length of said belt conveyor to effect the successive delivery of pins from the end of said belt conveyor into selected pockets, a frame mounted beneath said magazine provided with a plurality of pin support units conforming in arrangement with the arrangement of said pockets in said magazine, a plurality of pin receiving cups located beneath said frame, and means for moving said frame to effect the discharge of a single pin from each of said pockets into each of said pin receiving cups.

8. The invention defined in claim 7 further including supports for said magazine, and means mounting said magazine on said supports for vertical yielding movement relative to said pin receiving cups.

9. The invention defined in claim 6 wherein each of said pockets in said magazine comprises spaced downwardly inclined pin guides, a butt guide and a pin head rest, and wherein said pin supports on said frame coact with said pin head rest to support the butt end of a pin while said head end of the pin rests on said head rest, said pin while so supported in a pin pocket being positioned with its longitudinal axis lying substantially in a horizontal plane.

10. The invention defined in claim 9 wherein said pin guides of the pin pocket holding the #1 pin are substantially longer than the pin guides for the #2–#10 pin pockets, and non-friction rollers mounted on said #1 pocket pin guides for radial engagement with a bowling pin for guiding a pin delivered from said distributing conveyor into said #1 pocket.

11. The invention defined in claim 6 wherein each of said pin pockets in said magazine comprise laterally spaced vertical side plates of a height sufficient to contain two stacked generally horizontally positioned pins, guide means carried by said side plates for guiding pins delivered butt end foremost into said generally horizontal positions thereon, and means for limiting longitudinal forward and rearward movement of pins received in said pockets.

12. A pin magazine for a pinspotting machine comprising a magazine frame, a plurality of pin pockets in said magazine frame, said pockets being arranged in accordance with a predetermined playing configuration, each of said pockets comprising a pair of laterally spaced vertical side plates, a butt guide, and a head end supporting member, means resiliently supporting each of said butt guides between adjacent pairs of side plates, pin guides carried by said side plates for influencing the travel of pins delivered into said pockets to a position of rest in which the longitudinal axis of each pin so delivered tends to be in a generally horizontal plane, and means coacting with said head end supporting members to so support at least one pin in each of said pockets.

13. The invention defined in claim 12 including supports mounting said frame for vertical floating movement on the frame of said machine.

14. The invention defined in claim 12, wherein:
said last named means comprises frame means, a plurality of laterally spaced sets of supports carried by said frame means conforming in arrangement with and complementing said pin pockets of said magazine, means mounting said frame means for planar movement relative to said magazine, and mechanism for shifting said frame means relative to said pockets of said magazine to release said pins from said spaced pin supports of said frame means for discharge of a set of pins from said magazine, and means located beneath said frame means to receive pins discharged from said pockets of said magazine, and
said mechanism comprises spring means tending normally to effect the discharging movement of said frame, a cam, a cam lever having a cam follower, a cam shaft supporting said cam, and means for driving said cam shaft to effect the movement of said cam lever onto a low portion of said cam, whereby said spring means effect the longitudinal movement of said frame means beneath said pockets to effect the release of said pins, and
the means for driving said cam shaft includes a switch, an actuator plate in a selected pin pocket of said magazine for engagement by a pin delivered into said pocket to actuate said switch and close an operating circuit, a solenoid in said circuit, a motor energized by said switch, stop means normally maintaining said cam lever in an inoperative position, and means actuated by said solenoid for disengaging said stop means from said lever, whereby said cam follower of said lever tracks said cam to effect the movement of said pin supporting frame means.

15. The invention defined in claim 3, further including spaced pin receiving and delivering arms pivotally mounted on the discharge end of said conveyor, an inwardly and upwardly inclined flange on each of said arms, a plurality of non-friction rollers mounted on said flanges and so disposed relative thereto such that pins delivered onto said rollers have substantially radial contact therewith and can fall free of obstruction into a selected pocket of said magazine, and means responsive to the pivoting of the delivery arms to deliver a pin to the storage means for causing movement of the delivery end of the conveyor to the next successive delivery station in accordance with a predetermined delivery program.

16. The invention defined in claim 15 wherein said conveyor comprises an endless belt, a continuously driven shaft for driving said belt, a gear on said shaft, a driven shaft for operating said means for moving said conveyor above said magazine and varying the length of said conveyor including means meshing with a gear and driven intermittently by said driving gear, a clutch for coupling the drive of said shaft by said gears, trip means actuated by a pin depressing said arms for actuating said clutch to effect the movement of said last-named means.

17. The invention defined in claim 16, wherein said clutch includes stop means for incapacitating said clutch, and said trip means includes a stop plate movable into and out of operative position relative to said stop means, said stop plate comprising a first and a second stop blade, means positioning said first stop blade to engage said stop means and incapacitate said clutch until a pin depresses said arms and drops therefrom into a selected pocket, and means positioning said second stop blade to engage said stop means upon such depressing of said arms, and means for returning said arms to their "up" position and thereby releasing said second stop plate from engagement with said stop means whereby said conveyor is then moved to effect the delivery of the next pin to a selected pocket in said magazine.

18. A distributing apparatus for conveying and delivering articles from a receiving station to a plurality of longitudinally and laterally spaced discharge stations, comprising an elongated conveyor, means supporting said conveyor comprising a rigid first cantilevered section and a second reciprocally mounted section carried by said first section, mechanism for driving said conveyor, said mechanism comprising a first cam for moving said conveyor back and forth laterally above said discharge stations, a second cam for effecting the longitudinal reciprocation of said second section relative to said first section and means for actuating said driving mechanism to move said conveyor and effect the delivery of articles seriatim at selected discharge stations.

19. The invention defined in claim 18 wherein said driving mechanism includes a driven gear, and said first and second cams are carried on opposite sides of said gear, and wherein said first and second cams include motion controlling tracks for causing the movement of said first section conveyor back and forth, and of said second section inward and outward longitudinally relative to said first section in accordance with a predetermined delivery pattern.

20. The invention defined in claim 19, wherein one end of said second section of said conveyor is supported in said first section of said conveyor, and the other end extends free to said discharge stations, trip means swingably mounted on the free end of said second section, means normally maintaining said trip means in raised inoperative position, a shaft mounting said driven gear, a clutch coacting with said driven gear, a driving gear meshing with said driven gear and stop means interrupting the operation of said clutch and the drive of said first named gear when an article being delivered from said free end of said second section is discharged therefrom, and for effecting the engagement of said clutch upon return of said trip means to said inoperative position, said stop means including a stop blade for incapacitating said clutch as soon as said conveyor is disposed in position to deliver the next article to a selected discharge station.

21. In a bowling pinspotting machine having a pin elevator for conveying pins from the pit of a bowling lane and a horizontally located pin receiving and handling assembly including devices for spotting pins on the pin deck of said lane, a distributor for distributing pins received from said elevator to said assembly comprising a pin conveyor, said conveyor having a first pin distributing section, a second distributing section reciprocally mounted on said first section and having a free end from which pins are discharged, means mounting only one end of the first pin distributing section to the rest of the distributor, said second pin distributing section being mounted only to said first pin distributing section, means for effecting the controlled movement of said conveyor back and forth in a fixed plane above said assembly such that pins delivered from the free end of said second section can be delivered at selected positions of rest of said conveyor, and control means for controlling the movement of said conveyor and said second section thereof in accordance with a predetermined pin discharge pattern of movement.

22. The invention defined in claim 21 wherein said control means includes a first cam and a second cam, and means for rotating said cams.

23. The invention defined in claim 22 including pin actuated trip means carried by the free end of said second section, intermittently actuated driving means for said cams, and means actuated by said trip means for effecting the rotation of said cams.

References Cited

UNITED STATES PATENTS

| | | | |
|---|---|---|---|
| 1,613,330 | 1/1927 | Prescott | 198—232 |
| 2,686,053 | 8/1954 | Phillips | 273—43 |
| 3,409,296 | 11/1968 | Huck et al. | 273—43 |

ANTON O. OECHSLE, Primary Examiner

U.S. Cl. X.R.

198—38

UNITED STATES PATENT OFFICE
CERTIFICATE OF CORRECTION

Patent No. 3,526,401  September 1, 1970

John Zuercher

It is certified that error appears in the above identified patent and that said Letters Patent are hereby corrected as shown below:

Column 14, line 15, after "said" insert -- conveyor at one end for movement into positions at which articles can be delivered into selected discharge stations, --.

Signed and sealed this 23rd day of March 1971.

(SEAL)

Attest:

Edward M. Fletcher, Jr.
Attesting Officer

WILLIAM E. SCHUYLER, JR.
Commissioner of Patents